United States Patent
Kanji

(10) Patent No.: US 7,809,144 B2
(45) Date of Patent: Oct. 5, 2010

(54) AUDIO INPUT-OUTPUT MODULE, PLUG-IN DETECTION MODULE AND METHODS FOR USE THEREWITH

(75) Inventor: Ajaykumar Kanji, Austin, TX (US)

(73) Assignee: Integrated Device Technology, Inc., San Jose, CA (US)

( * ) Notice: Subject to any disclaimer, the term of this patent is extended or adjusted under 35 U.S.C. 154(b) by 1329 days.

(21) Appl. No.: 11/304,310

(22) Filed: Dec. 14, 2005

(65) Prior Publication Data

US 2007/0133828 A1      Jun. 14, 2007

(51) Int. Cl.
  *H04R 29/00* (2006.01)
(52) U.S. Cl. ......................................... 381/58; 381/123
(58) Field of Classification Search ................. 381/123, 381/74, 111, 11, 12, 80, 85, 110, 58, 59; 700/94; 439/668, 669; 370/473, 241
See application file for complete search history.

(56) References Cited

U.S. PATENT DOCUMENTS

| | | | |
|---|---|---|---|
| 6,970,752 B1 * | 11/2005 | Lim et al. | 700/94 |
| 7,038,499 B1 * | 5/2006 | Toosky | 327/78 |
| 2004/0081099 A1 * | 4/2004 | Patterson et al. | 370/241 |

\* cited by examiner

*Primary Examiner*—Vivian Chin
*Assistant Examiner*—Lun-See Lao
(74) *Attorney, Agent, or Firm*—Garlick Harrison, et al.

(57) ABSTRACT

A plug-in detection module includes an impedance network for producing a plug-in signal in response to a supply signal that varies when one of a plurality of plug-in receptors is coupled to a plug connector and when one of the plurality of plug-in receptors is decoupled. A reference signal generator generates a reference signal having a plurality of reference signal values. A comparator generates a detection signal when the plug-in signal compares favorably to the reference signal. A processing module detects which of the plurality of plug-in receptors have a plug connector coupled thereto.

25 Claims, 8 Drawing Sheets

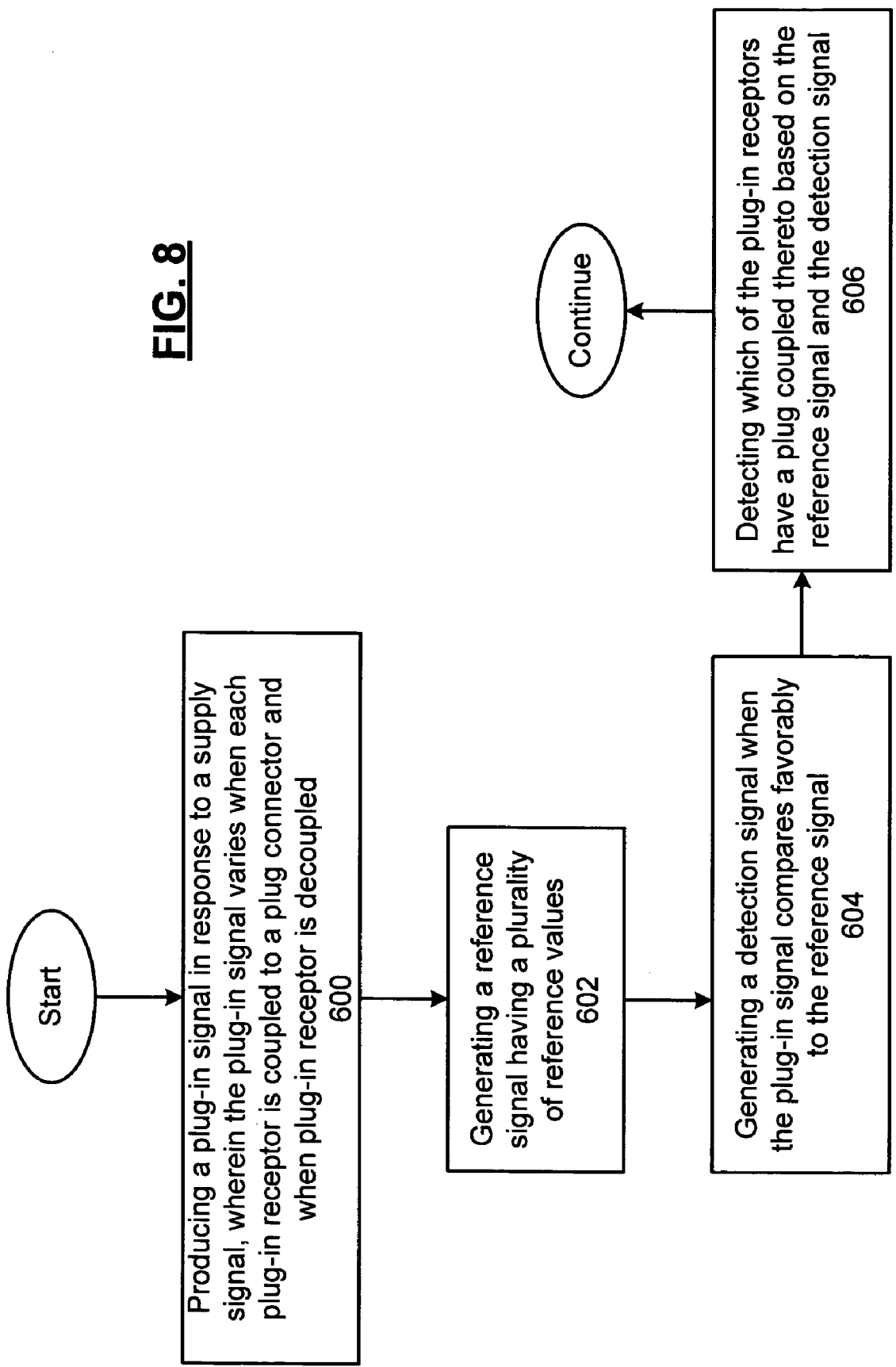

AUDIO INPUT-OUTPUT MODULE, PLUG-IN DETECTION MODULE AND METHODS FOR USE THEREWITH

CROSS REFERENCE TO RELATED PATENTS

None

BACKGROUND OF THE INVENTION

1. Technical Field of the Invention

The present invention relates to audio input-output modules as may be used in audio codecs, computers and related methods.

2. Description of Related Art

As is known, audio signals are processed by a wide variety of electronic equipment, including portable, or handheld, devices. Such devices include laptop, notebook and other personal computers, personal digital assistants (PDA), CD players, MP3 players, DVD players, AM/FM radio, satellite radio systems, in-band on channel digital radios, cellular telephones, consumer audio equipment such as stereo systems, home theater systems, cable and satellite tuners and set-top boxes, digital video recorders and other systems that support the processing of audio and video, etc. Each of these devices includes one or more integrated circuits to provide the functionality of the device. As an example, a computer may include an audio codec or other audio input-output module to support the processing of audio signals in order to produce an audio output that is delivered to the user through speakers, headphones or the like and/or to receive audio signals from an external device such as a microphone, CD player or other source of analog or digital audio signals.

A problem common to many of these devices is that many are equipped with multiple jacks for coupling signals such as audio input/output signals to and from the device. A user of the device may connect or disconnect these jacks while the device is in operation, either to discontinue the use of a connection or to couple a new peripheral or signal to the device. It is desirable to detect that a device or signal has been coupled or decoupled from each of the plurality of jacks in a manner that can be efficiently implemented in an electronic device.

BRIEF DESCRIPTION OF THE SEVERAL VIEWS OF THE DRAWINGS

FIG. 8 presents a flowchart representation of a method in accordance with the present invention.

DETAILED DESCRIPTION OF THE INVENTION INCLUDING THE PRESENTLY PREFERRED EMBODIMENTS

Figure 1:
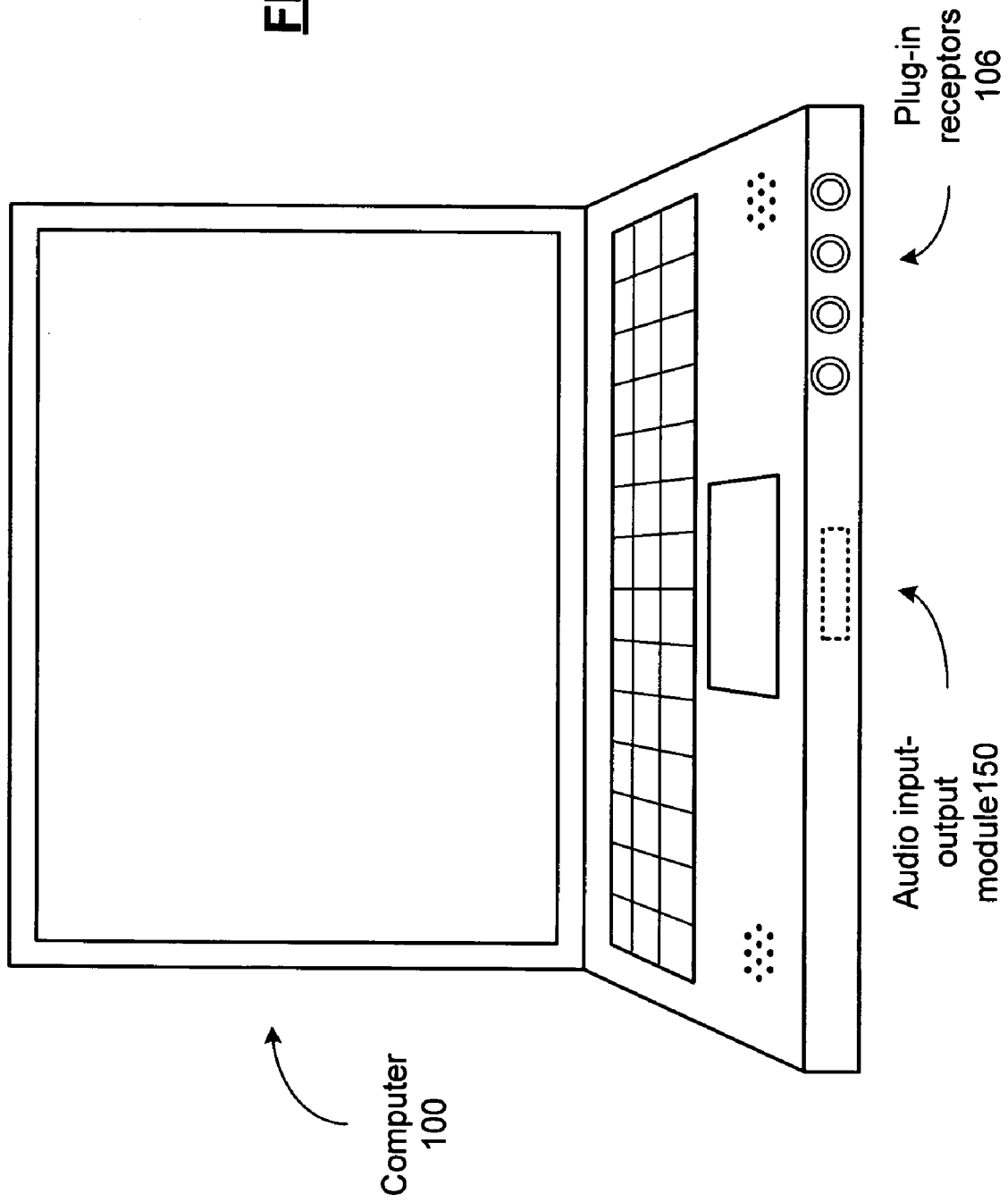
FIG. 1 presents a pictorial view of a computer in accordance with an embodiment of the present invention.

FIG. 1 presents a pictorial view of a computer in accordance with an embodiment of the present invention. In particular, computer 100 includes audio input-output module 150 for receiving audio signals, such as music, speech signals, audio tracks of movies or other signals, from an external device coupled through one or more of the plug-in receptors 106. In addition, audio input-output module is operable to provide one or more signals for coupling an audio output signal to external audio output devices such as speakers, stereo systems, headphones, ear buds, through one or more plug-in receptors 106.

Audio input-output module 150 is capable of detecting whether or not a plug connector is coupled to each of a plurality of plug receptors including various features and functions in accordance with the present invention that will be described in conjunction with the figures that follow.

Figure 2:
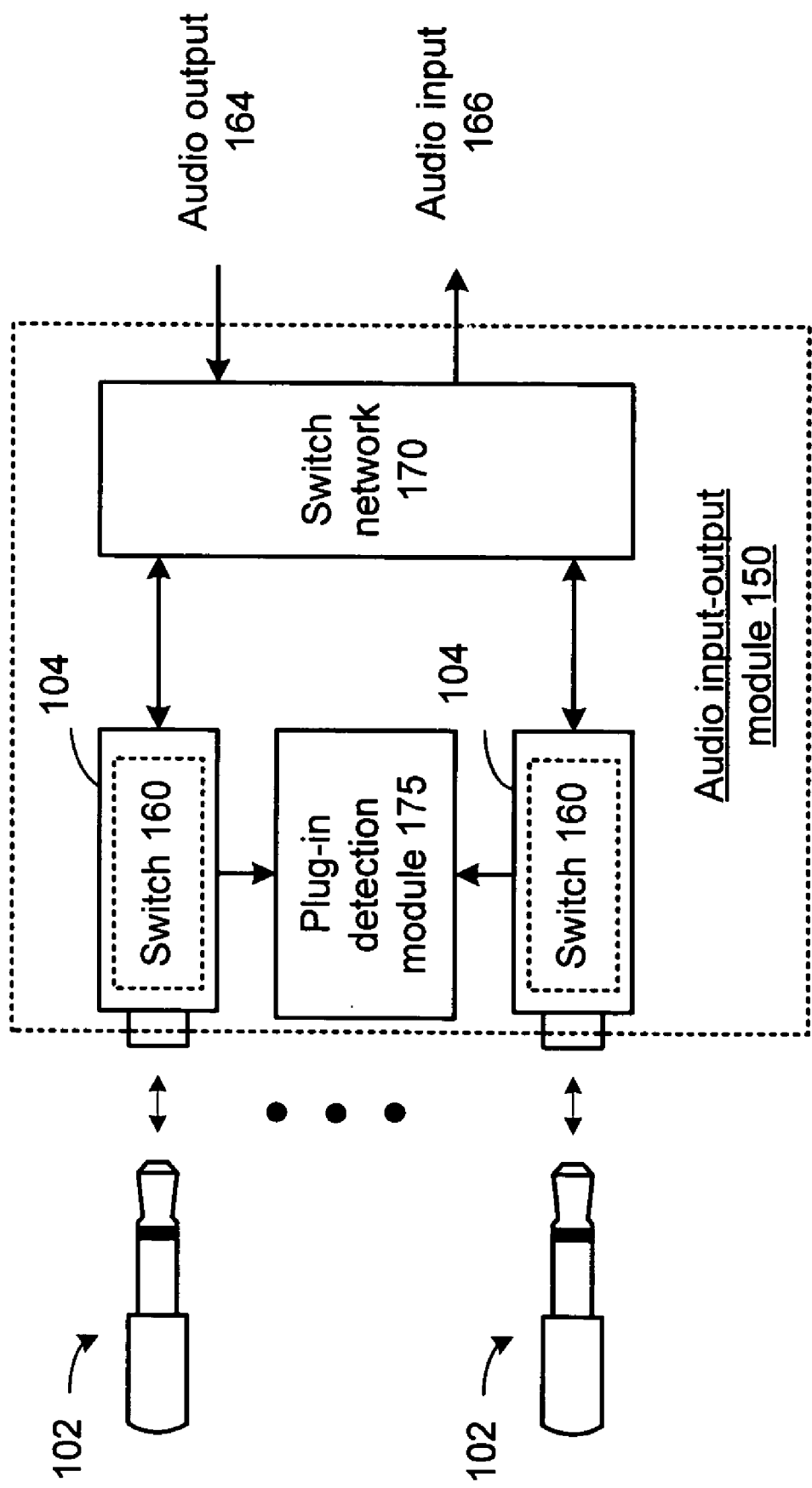
FIG. 2 presents a pictorial/block diagram representation of an audio output driver 150 in accordance with an embodiment of the present invention.

FIG. 2 presents a pictorial/block diagram representation of an audio input-output module 150 in accordance with an embodiment of the present invention. In particular, audio input-output module 150 includes a plurality of plug-in receptors 104 for coupling to a plurality of plug connectors 102. In an embodiment of the present invention, the plug connectors can be the same for each plug-in receptor 104 or different plug connector/plug-in receptor combinations can be used. The plug-in receptors 104 can be of the male or female, monaural or stereo varieties. The plug-in receptors 104 can be implemented in a standard configuration such as a ¼" phone connector, miniature or subminiature phone connector, RCA phone connector, 8-pin ham microphone connector, coaxial connector of N size, H size or other size, an S-video connector, a banana jack connector, a PL-259 connector, an F connector, a BNC connector or other plug or jack connector, either standard or non-standard that can be coupled and decoupled.

Each of the plurality of plug-in receptors 104 has a corresponding switch 160 that has a first state when coupled to a plug connector and a second state when plug-in receptor is decoupled from a plug connector. Audio input-output module 150 further includes plug-in detection module 175 for detecting which of the plurality of plug-in receptors 104 have a plug connector 102 coupled thereto. Switch network 170 selectively couples an audio output 164 to one of the plurality of plug-in receptors 104 and selectively receives an audio input 166 from one of the plurality of plug-in receptors 104. While audio inputs and outputs are specifically shown, the present invention may likewise couple video input and output signals, with or without one or more channels of corresponding audio.

These and other functions and features of the invention will be discussed further, including additional embodiments and implementations of the present invention in association with FIGS. 3-9 that follow.

Figure 3:
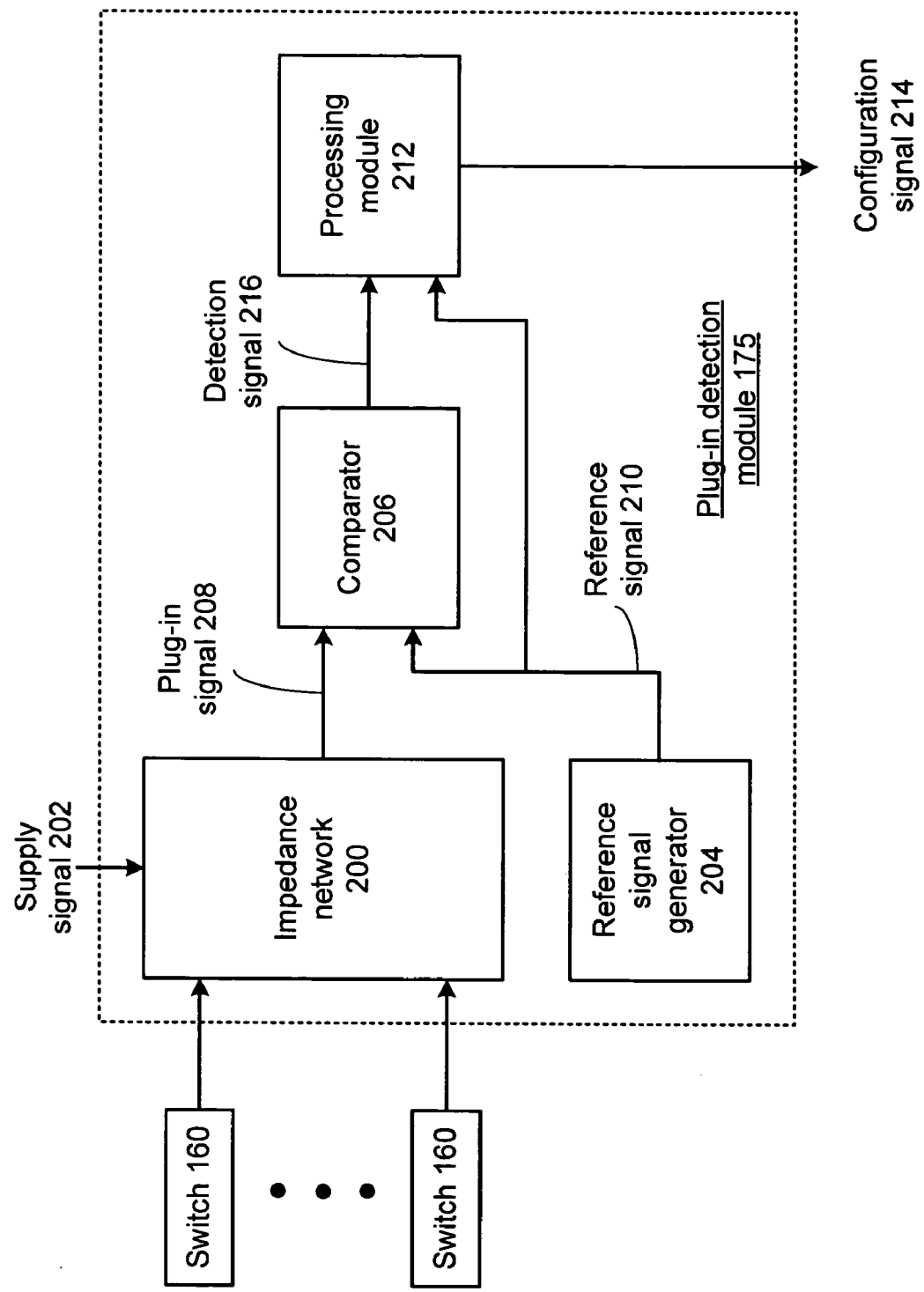
FIG. 3 presents a block diagram representation of a plug-in detection module 175 in accordance with an embodiment of the present invention.

FIG. 3 presents a block diagram representation of a plug-in detection module 175 in accordance with an embodiment of the present invention. In particular, plug-in detection module 175 includes an impedance network 200, operably coupled to the plurality of switches 160 for producing a plug-in signal 208 in response to a supply signal 202. The plug-in signal 208 varies when one of a plurality of plug-in receptors 104 is coupled to a plug connector 102 and when one of the plurality of plug-in receptors 104 is decoupled from a plug connector 102.

A reference signal generator 204 generates a reference signal 210 that has a plurality of reference signal values. Comparator 206 is operably coupled to the plug-in signal 208 and the reference signal 210, and generates a detection signal 216 when the plug-in signal compares favorably to the reference signal. A processing module 212 is operably coupled to the detection signal 216 and the reference signal 210 for detecting which of the plurality of plug-in receptors 104 has a plug connector 102 coupled thereto and for generating a configuration signal 214 that includes this information.

In an embodiment of the present invention, the plurality of plug-in receptors 104 include four or more jacks. In an embodiment of the present invention each plug-in receptor has a dedicated function for coupling to an audio line input, an audio line output, a video input, a video output, a headphone, or a microphone. In an alternative embodiment of the present invention, each plug-in receptor 104 can be used for multiple purposes and may be selectively switched, such as by switch network 170 to couple any one of to an audio line input, an audio line output, a video input, a video output, a headphone, or a microphone.

Figure 4:
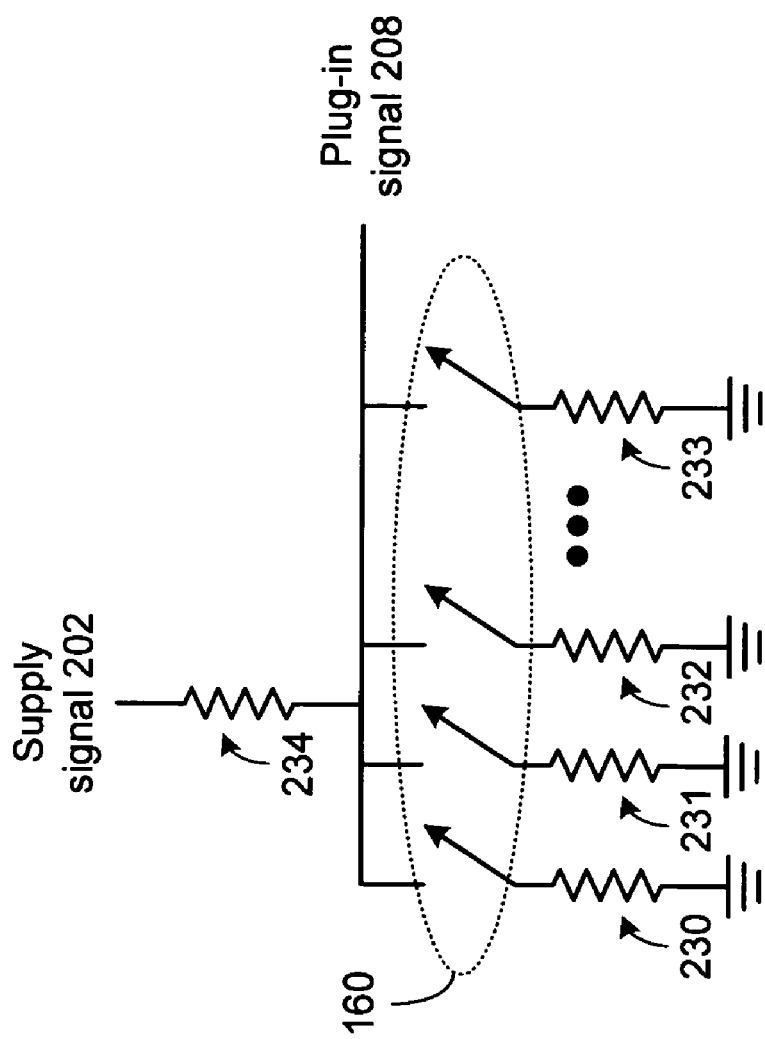
FIG. 4 presents a schematic diagram representation of an impedance network and a plurality of switches in accordance with an embodiment of the present invention.

FIG. 4 presents a schematic diagram representation of an impedance network and a plurality of switches in accordance with an embodiment of the present invention. In particular, impedance network 200 includes a resistive voltage divider implemented with a plurality of high accuracy resistors 230-234, such as 5% resistors, 1% resistors or resistors with more accuracy.

Switches 160 have a first state such as a closed state and a second state, such as an open state—however, the states can be reversed, or other states such as high impedance, low impedance can be used if switches 160 are implemented using electronic components rather than mechanical switching elements.

In an embodiment of the present invention, the values of resistors 230-233 are chosen such that the each possible combination switches 160 between the open and closed states yields a unique resistance on the lower leg of the divider (between the port of plug-in signal 208 and ground) that in turn yields a unique voltage value for plug-in signal 208 based on the voltage divider configuration. The particular configuration of each plug-in receptor 104 (being coupled or decoupled to a plug connector) can therefore be determined from the voltage level of plug-in signal 208.

Considering the example of four plug-in receptors 104 with four corresponding switches 160, and considering the four resistors shown to have a resistance to be defined as presented below:

Resistor 230—$R_0$
Resistor 231—$R_1$
Resistor 232—$R_2$
Resistor 233—$R_3$

The resistance of the lower leg of the circuit has $2^4=16$ possible values based on sixteen possible plug-in receptor conditions—detected based on the unique voltage of plug-in signal 208 that varies based on whether each of the four switches is opened or closed and therefore which of the four plug-in receptors (referenced below as A, B, C and D) have a plug-in connector couple thereto. In particular, these values can be represented as follows:

| Resistance | Plug-in Receptor Condition (Plug-in Receptors Coupled) |
|---|---|
| ∞ (open circuit) | None |
| $R_0$ | A |
| $R_1$ | B |
| $R_2$ | C |
| $R_3$ | D |
| $R_0 \| R_1$ | A, B |
| $R_0 \| R_2$ | A, C |
| $R_0 \| R_3$ | A, D |
| $R_1 \| R_2$ | B, C |
| $R_1 \| R_3$ | B, D |
| $R_2 \| R_3$ | C, D |
| $R_0 \| R_1 \| R_2$ | A, B, C |
| $R_0 \| R_1 \| R_3$ | A, B, D |
| $R_0 \| R_2 \| R_3$ | A, C, D |
| $R_1 \| R_2 \| R_3$ | B, C, D |
| $R_0 \| R_1 \| R_2 \| R_3$ | A, B, C, D |

In an embodiment of the present invention, the values $R_0=39.2$ kΩ, $R_1=20$ kΩ, $R_2=10$ kΩ and $R_3=5.1$ kΩ can be used for this purpose, however, a large number of other values are likewise possible. Because the lower leg resistances takes on one of sixteen possible values, the resistive voltage divider yields a plug-in signal with one of sixteen possible voltages, based on the particular combination of plug-connectors either coupled to or decoupled from the plug-in receptors 104.

While the resistive voltage divider is shown as driven by a supply voltage 202 and ground, supply voltages, both possible and negative, ground and virtual ground alternating current (AC) and direct current (DC) are likewise possible within the broad scope of the present invention. While resistors are used to implemented impedance network 200 in this configuration, other configurations using other circuit elements having capacitive or inductive impedances are likewise possible.

Figure 5:
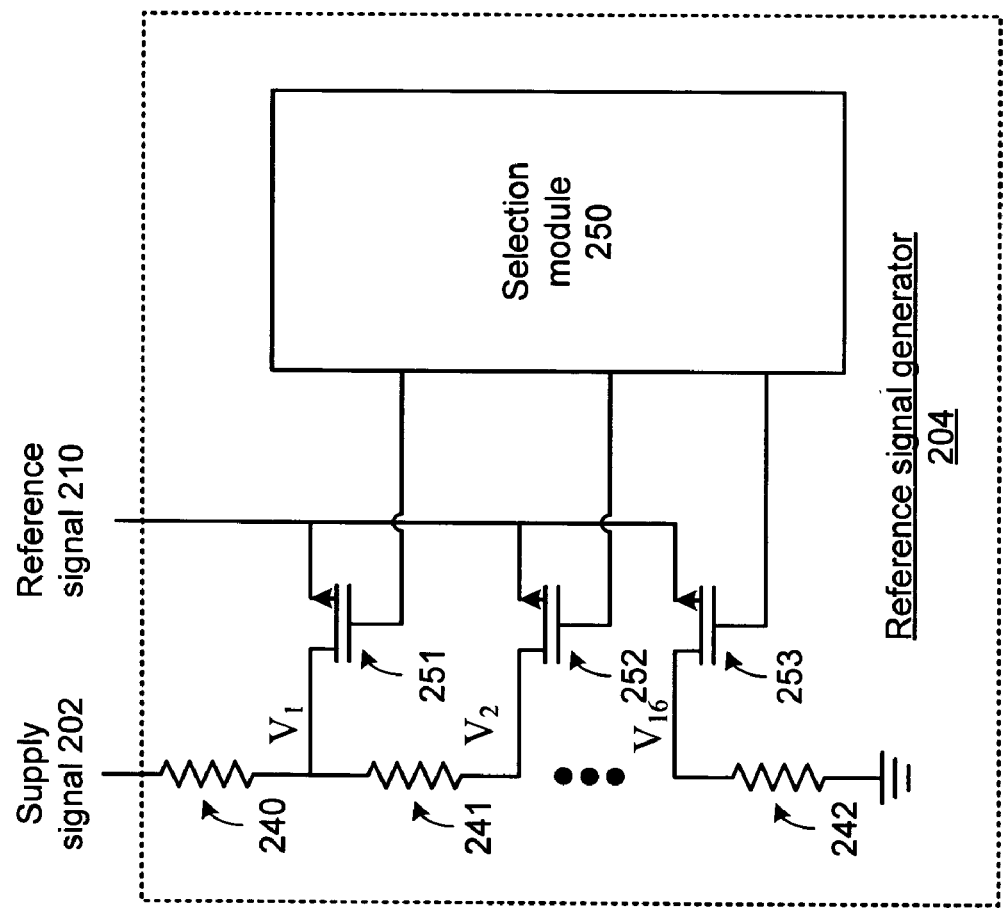
FIG. 5 presents a schematic/block diagram representation of reference signal generator in accordance with an embodiment of the present invention.

FIG. 5 presents a schematic/block diagram representation of reference signal generator in accordance with an embodiment of the present invention. In particular, reference signal generator 204 generates a reference signal value sequence that includes a plurality of reference signal values. In an embodiment of the present invention, the reference signal generator 204 includes a multi-tap resistive voltage divider of resistors 240-242, and selection module 250 for selecting a sequence of voltage divider taps via transistors 251-253.

Considering the example presented in association with FIG. 4, these reference signal values correspond to the $2^n=16$ possible voltages of plug-in signal 208 generated by impedance network 208. In an embodiment of the present invention, the reference signal generator 204 generates the sequence of reference values to scan the possible reference signal values in descending order (assigned a variable in descending order from largest to smallest as $V_1, V_2 \ldots V_{16}$) by turning on transistor 251, while turning off each of the other transistors to generate $V_1$; turning on transistor 252, while turning off each of the other transistors to generate $V_2$; etc.

Processing module 212 detects which of the plurality of plug-in receptors have a plug connector coupled thereto by determining one of the plurality of reference signal values when the plug-in signal 208 compares favorably to the reference signal 210, and by indexing one of the plurality of reference signal values to a look-up table. Following the example described above, the sixteen possible plug-in signal voltages correspond to sixteen possible reference signal values, and therefore to the sixteen possible plug-in receptor conditions as shown in the look-up table below:

| Reference signal value | Plug-in Receptor Condition (Plug-in Receptors Coupled) |
| --- | --- |
| $V_1$ | None |
| $V_2$ | A |
| $V_3$ | B |
| $V_5$ | C |
| $V_9$ | D |
| $V_4$ | A, B |
| $V_6$ | A, C |
| $V_{10}$ | A, D |
| $V_7$ | B, C |
| $V_{11}$ | B, D |
| $V_{13}$ | C, D |
| $V_8$ | A, B, C |
| $V_{12}$ | A, B, D |
| $V_{14}$ | A, C, D |
| $V_{15}$ | B, C, D |
| $V_{16}$ | A, B, C, D |

In an embodiment of the present invention, each reference signal value is offset slightly below the corresponding plug-in signal value. As the reference signal values are scanned from highest to lowest, each new reference signal value is compared with plug-in signal 208 by comparator 206. When a new reference signal value falls below the plug-in signal value, detection signal 216 is asserted. This indicates that a match has been found.

While a sequence of reference signal values is described above in terms of a descending order, other orders including an ascending order can likewise be used within the broad scope of the present invention. In an embodiment of the present invention, selection module 250 includes a 16-bit shift register; however, other circuits and software are likewise possible to implement within the broad scope of the present invention.

Figure 6:
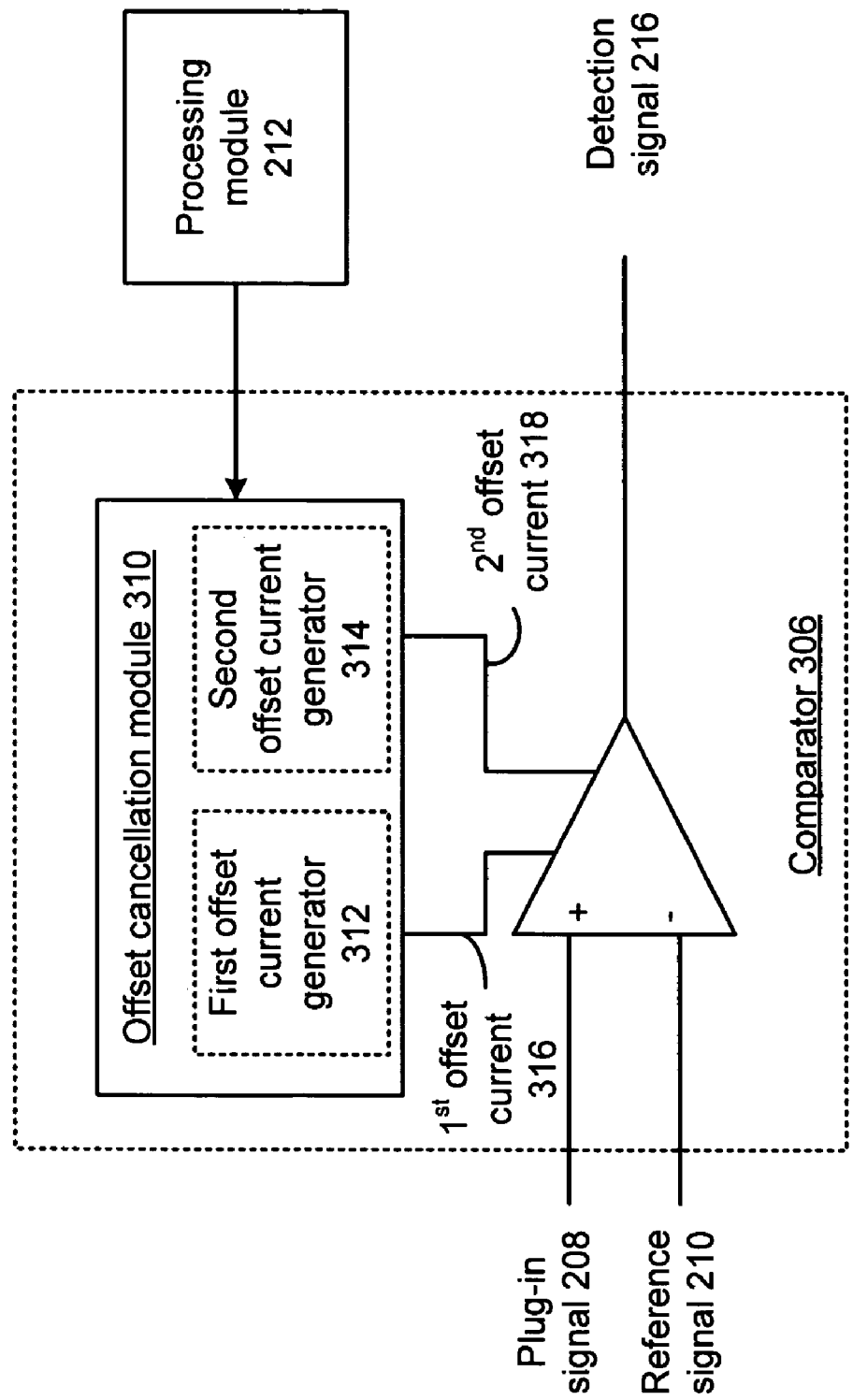
FIG. 6 presents a schematic/block representation of a comparator in accordance with an embodiment of the present invention.

FIG. 6 presents a schematic/block representation of a comparator in accordance with an embodiment of the present invention. In this embodiment, comparator 306 includes an offset cancellation module 310 for automatically balancing a first input current and a second input current of the comparator to enable more accurate measurements. In particular, offset cancellation module 310 includes a first offset current generator 312 for generating a first offset current 316 having a plurality of first offset current values at a first polarity. In addition, cancellation module 310 includes a second offset current generator for generating a second offset current having a plurality of second offset current values of a second polarity. Further, the processing module 212 is operably coupled to the first offset current generator 312 to control the first offset current generator 312 to generate a sequence of first offset current values, and control the first offset current generator 312 to hold the first offset current value when the first input current compares favorably to the second input current. In addition, the processing module 212 is operably coupled to the second offset current generator 314 to control the second offset current generator 314 to generate a sequence of second offset current values, and control the second offset current generator 314 to hold the second offset current value when the first input current compares favorably to the second input current.

In operation, the first offset current generator 312 and second offset current generator 314 each include a plurality of individual current generators, that can be selectively activated to create the first and second offset currents from a superposition of the individual currents. In an embodiment of the present invention, the individual current generators generate currents that are substantially powers of ($\frac{1}{2}$) such as 1, $\frac{1}{2}$, $\frac{1}{4}$, $\frac{1}{8}$, $\frac{1}{16}$ ... etc, of a basic offset current value. The first and second offset current values are generated by turning on or off each of these individual current generators to create a total offset current having a particular value. In this fashion, a particular offset current can be selected by scanning a binary sequence of control signals in an order that turn on the individual current generators and generate an order of offset current values that vary in increments or decrements as small as ($\frac{1}{2}$)$^n$ of the basic offset current value. The order can be an ascending order or descending order or another order that can be efficiently implemented. If the first and second input currents, corresponding to the positive and negative inputs of the comparator 306, are equalized within the accuracy of +/− the lowest resolution of the offset current generator, the particular offset current that generated this balance can be held to substantially cancel the input offset of comparator 206.

In an embodiment of the present invention, the first offset current 316 and the second offset current 318 are scanned simultaneously so that the second offset current 318 mirrors the first offset current 316, but with opposite polarity. In an embodiment of the present invention, the first offset current 316 begins with a large positive value and second offset current begins with a large negative value. The first offset current 316 is gradually decreased and the second offset current 318 is increased a corresponding amount until the first and second input currents are equalized as discussed above. At this point, the values of the first offset current 316 and the second offset current 318 are held to maintain the balanced state of comparator 206.

Figure 7:
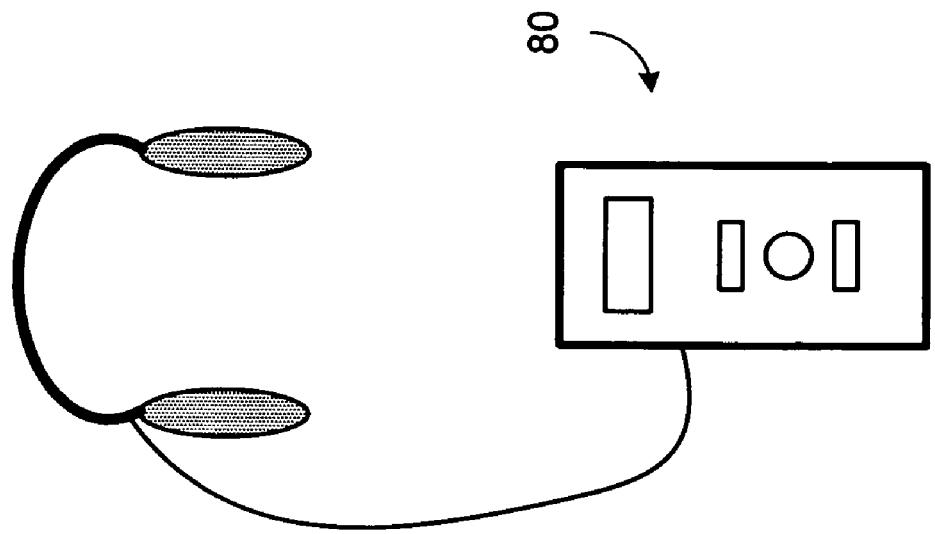
FIG. 7 presents a pictorial view of a handheld audio device in accordance with an embodiment of the present invention.

FIG. 7 presents a pictorial view of a handheld audio device in accordance with an embodiment of the present invention. While the audio output drivers 150 and 151 have been described in conjunction with their use in a computer such as computer 100, audio output drivers 150 and 151 may likewise be incorporated in a handheld audio device 80 for replaying stored audio files, as well as in voice recorders, cell-phones, and other audio devices, video devices and other electronic devices that process audio signals to provide an audio output. In an embodiment of the present invention, one or more of the circuit modules of audio input/output module 150, plug-in detection module 175, impedance network 200, reference signal generator 204, comparator 206 or processing module 212 are implemented as part of an integrated circuit such as a system on a chip integrated circuit.

FIG. 8 presents a flowchart representation of a method in accordance with the present invention. In particular, a method is presented for use in conjunction with one or more of the features or functions described in association with FIGS. 1-7. Step 600 includes producing a plug-in signal in response to a supply signal, wherein the plug-in signal varies when each of a plurality of plug-in receptors is coupled to a plug connector and when each of the plurality of plug-in receptors is decoupled. In step 602, a reference signal is generated having a plurality of reference signal values. In step 604, a detection signal is generated when the plug-in signal compares favorably to the reference signal. In step 606, which of the plurality of plug-in receptors have a plug coupled thereto, are detected based on the reference signal and the detection signal.

In an embodiment of the present invention, the plurality of plug-in receptors include four or more jacks for coupling an audio module to at least one of: an audio line input, and audio line output, a video input, a video output, a headphone, and a microphone. In addition, step 604 optionally includes generating a reference signal value sequence that includes the plurality of reference signal values.

Figure 9:
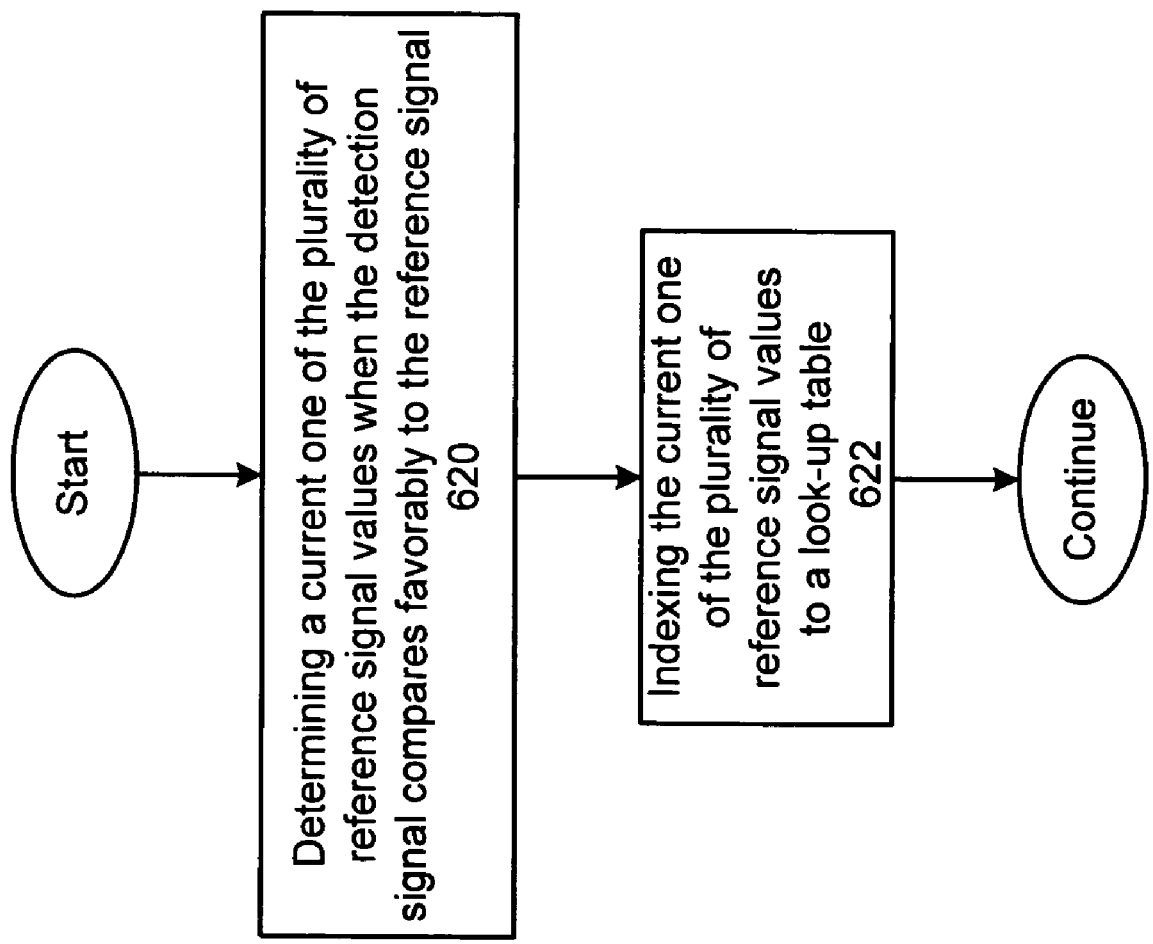
FIG. 9 presents a flowchart representation of a method in accordance with the present invention.

FIG. 9 presents a flowchart representation of a method in accordance with the present invention. In particular, a method is presented for use in conjunction with one or more of the features or functions described in association with FIGS. 1-8. In particular, a method is presented for use in conjunction with Step 606 presented in association with FIG. 8. In step 620 the method determines one of the plurality of reference signal values when the plug-in signal compares favorably to the reference signal. In step 622, one of the plurality of reference signal values is indexed to a look-up table.

The various modules disclosed herein, including processing module 212, can be implemented using hardware or using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions illustrated herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing an audio input-output module and plug-in detection module that can be implemented on an integrated circuit such as a system on a chip integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. An audio input-output module comprising:
   a plurality of plug-in receptors, each of the plurality of plug-in receptors having a corresponding plurality of switches that have a first state when coupled to a plug connector and a second state when plug-in receptor is decoupled from the plug connector;
   an impedance network, operably coupled to the plurality of switches, for producing a plug-in signal in response to a supply signal that varies based on whether each of the plurality of switches is in the first state or the second state;
   a reference signal generator for generating a reference signal having a plurality of reference signal values;
   a comparator, operably coupled to the plug-in signal and the reference signal, for generating a detection signal when the plug-in signal compares favorably to the reference signal, wherein the comparator includes a first input current and a second input current and wherein the comparator further includes an offset cancellation module for automatically balancing the first input current and the second input current that includes a first offset current generator for generating a first offset current having a plurality of first offset current values;
   a processing module, operably coupled to the detection signal, the first offset current generator and the reference signal, for detecting which of the plurality of plug-in receptors have a plug connector coupled thereto, and further for controlling the first offset current generator to generate a sequence of first offset current values, and controlling the first offset current generator to hold the first offset current value when the first input current compares favorably to the second input current; and
   a switch network for selectively coupling an audio output to one of the plurality of plug-in receptors.

2. The audio input-output module of claim 1 wherein first offset current has a first polarity and the offset cancellation module includes:
   a second offset current generator for generating a second offset current having a plurality of first offset current values of a second polarity;
   wherein the processing module is operably coupled to the second offset current generator, and wherein the processing module is further operable to control the second offset current generator to generate a sequence of second offset current values, and control the second offset current generator to hold the second offset current value when the first input current compares favorably to the second input current.

3. The audio input-output module of claim 1 wherein the sequence of first offset current values and the sequence of second offset current values are scanned simultaneously until the first input current compares favorably to the second input current.

4. The audio input-output module of claim 1 wherein the plurality of plug-in receptors include four or more jacks for coupling an audio module to at least one of: an audio line input, and audio line output, a video input, a video output, a headphone, and a microphone.

5. The audio input-output module of claim 1 wherein the impedance network includes a resistive voltage divider.

6. The audio input-output module of claim 5 wherein the resistive voltage divider includes a plurality of high accuracy resistors.

7. The audio input-output module of claim 1 wherein the reference signal generator generates a reference signal value sequence that includes the plurality of reference signal values.

8. The audio input-output module of claim 7 wherein the reference signal generator includes a multi-tap resistive voltage divider, and selection module for selecting a sequence of voltage divider taps.

9. The audio input-output module of claim 1 wherein the processing module detects which of the plurality of plug-in receptors have a plug connector coupled thereto by determining one of the plurality of reference signal values when the plug-in signal compares favorably to the reference signal, and by indexing one of the plurality of reference signal values to a look-up table.

10. The audio input-output module of claim 1 wherein at least one of: the reference signal generator, the comparator, the audio output driver and the processing module, is implemented as part of a system on a chip integrated circuit.

11. The audio input-output module of claim 1 wherein the switch network is further operable to selectively receive an audio input from one of the plurality of plug-in receptors.

12. A plug-in detection module comprising:
an impedance network for producing a plug-in signal in response to a supply signal that varies when one of a plurality of plug-in receptors is coupled to a plug connector and when one of the plurality of plug-in receptors is decoupled;
a reference signal generator for generating a reference signal having a plurality of reference signal values;
a comparator, operably coupled to the plug-in signal and the reference signal, for generating a detection signal when the plug-in signal compares favorably to the reference signal, wherein the comparator includes a first input current and a second input current and wherein the comparator further includes an offset cancellation module for automatically balancing the first input current and the second input current that includes a first offset current generator for generating a first offset current having a plurality of first offset current values;
a processing module, operably coupled to the detection signal, the first offset current generator and the reference signal, for detecting which of the plurality of plug-in receptors have a plug connector coupled thereto, and further for controlling the first offset current generator to generate a sequence of first offset current values, and controlling the first offset current generator to hold the first offset current value when the first input current compares favorably to the second input current.

13. The plug-in detection module of claim 12 wherein first offset current has a first polarity and the offset cancellation module includes:
a second offset current generator for generating a second offset current having a plurality of first offset current values of a second polarity;
wherein the processing module is operably coupled to the second offset current generator, and wherein the processing module is further operable to control the second offset current generator to generate a sequence of second offset current values, and control the second offset current generator to hold the second offset current value when the first input current compares favorably to the second input current.

14. The audio input-output module of claim 12 wherein the sequence of first offset current values and the sequence of second offset current values are scanned simultaneously until the first input current compares favorably to the second input current.

15. The plug-in detection module of claim 12 wherein the plurality of plug-in receptors include four or more jacks for coupling an audio module to at least one of: an audio line input, and audio line output, a video input, a video output, a headphone, and a microphone.

16. The plug-in detection module of claim 12 wherein the impedance network includes a resistive voltage divider.

17. The plug-in detection module of claim 16 wherein the resistive voltage divider includes a plurality of high accuracy resistors.

18. The plug-in detection module of claim 12 wherein the reference signal generator generates a reference signal value sequence that includes the plurality of reference signal values.

19. The plug-in detection module of claim 18 wherein the reference signal generator includes a multi-tap resistive voltage divider, and selection module for selecting a sequence of voltage divider taps.

20. The plug-in detection module of claim 12 wherein the processing module detecting which of the plurality of plug-in receptors have a plug connector coupled thereto by determining one of the plurality of reference signal values when the plug-in signal compares favorably to the reference signal, and by indexing one of the plurality of reference signal values to a look-up table.

21. The plug-in detection module of claim 12 wherein at least one of: the reference signal generator, the comparator, and the processing module, is implemented as part of a system on a chip integrated circuit.

22. A method comprising:
producing a plug-in signal in response to a supply signal, wherein the plug-in signal varies when each of a plurality of plug-in receptors is coupled to a plug connector and when each of the plurality of plug-in receptors is decoupled;
generating a reference signal having a plurality of reference signal values;
generating a detection signal when the plug-in signal compares favorably to the reference signal via a comparator that includes a first input current and a second input current that are automatically balanced by:
generating a sequence of first offset current values to offset the first input current; and
holding the first offset current value when the first input current compares favorably to the second input current; and detecting which of the plurality of plug-in receptors have a plug coupled thereto based on the reference signal and the detection signal.

23. The method of claim 22 wherein the plurality of plug-in receptors include four or more jacks for coupling an audio module to at least one of: an audio line input, and audio line output, a video input, a video output, a headphone, and a microphone.

24. The method of claim 22 wherein the step of generating a reference signal includes generating a reference signal value sequence that includes the plurality of reference signal values.

25. The method of claim 22 wherein the step of detecting which of the plurality of plug-in receptors have a plug coupled thereto includes:
  determining one of the plurality of reference signal values when the plug-in signal compares favorably to the reference signal; and
  indexing one of the plurality of reference signal values to a look-up table.

* * * * *